June 2, 1970 R. V. WOOD 3,515,459
INLAY DIFFRACTION GRATINGS

Filed Jan. 3, 1967 2 Sheets-Sheet 1

*Remsen V. Wood*
INVENTOR.

BY *John F. McClellan*

AGENT

June 2, 1970 R. V. WOOD 3,515,459

INLAY DIFFRACTION GRATINGS

Filed Jan. 3, 1967 2 Sheets-Sheet 2

*Remsen V. Wood*
INVENTOR.

BY *John F. McClellan*

AGENT

United States Patent Office 3,515,459
Patented June 2, 1970

3,515,459
INLAY DIFFRACTION GRATINGS
Remsen V. Wood, Riderwood, Md. 21139
Continuation-in-part of application Ser. No. 467,312,
June 28, 1965, which is a continuation-in-part of application Ser. No. 797,324, Jan. 9, 1969. This application
Jan. 3, 1967, Ser. No. 606,988
Int. Cl. G02b 5/18
U.S. Cl. 350—162
1 Claim

ABSTRACT OF THE DISCLOSURE

Spiral diffraction gratings having integral inlays defined by differences in ruling, differences in reflectivity, differences in plane, and the like, whereby the gratings are enhanced in appearance and utility and the inlays are enhanced in visibility.

---

This application is a continuation-in-part of my copending application Ser. No. 467,312, filed June 28, 1965, now abandoned but continued-in-part as application Ser. No. 797,324, filed Jan. 9, 1969.

This invention relates generally to optical diffraction gratings and specifically to improvements in the structure, manufacture, and design of gratings used for ornamental purposes as in jewelry and in labels.

Commercial exploitation of ornamental diffraction gratings was attempted sporadically for fifty years before the modern spiral ruling, embossed in a reflective surface protected by a conforming transparent plastic film, was perfected.

Despite widespread use of the modern spiral grating, various aspects of the product have been inventively improved and adapted to new uses, as revealed in part by the following objects of this invention:

To provide as a new article of manufacture, in the nature of labels and of costume jewelry, spiral diffraction gratings inlaid with patterns ornamental and/or informational in character, To provide such inlaid diffraction gratings which, on illumination, will provide color information concerning the inlays, to observers located within wide azimuthal angles about the gratings, To provide such diffraction gratings in which the inlay and background are formed of one piece to allow flexing and conformance to non-flat surfaces without danger of separation of parts, To provide such diffraction gratings in which the inlay patterns are protected from wear by conforming transparent covering, To provide such diffraction gratings in which inlay patterns are enhanced by displacement from the planes of adjacent surfaces, and To provide such diffraction gratings in which the inlay patterns are visibly contoured in relief.

These and other objects of the invention will be better understood from a study of the specification and the drawings in which.

Diffraction grating inlays depend, for their unique beauty and utility, on color contrast between inlay and background. In both reflection and transmission gratings it is essential that the observer see color from the grating to appreciate the ornamental effect.

Inlays in, and of, straight-line gratings have been proposed but have not met with lasting commercial success, probably because straight-line gratings are highly directional. Even under favorable lighting conditions observers must be within narrow arcs, as defined by the rulings in relation to the light source used, to observe the spectra. This strict directionality limits the attractiveness and usefulness of straight-line grating inlays.

The spiral grating inlay overcomes the directional deficiency of the straight-line grating inlay by taking advantage of a characteristic unique to circular rulings. If, under good lighting conditions, an observer can see color from a spiral ruling at one azimuth, observers similarly located with respect to the grating at all other azimuths can also see color from the ruling. This increases the probability that the presence of an inlay in the ruling will be seen and appreciated through color contrast.

According to the present invention then, the probability of observing color contrast in a grating inlay is increased by provision of circular ruling in the background, the inlay, or both.

Figure 1:
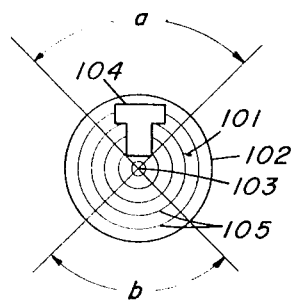
FIGS. 1–9 are face views of various embodiments of the invention.

FIG. 1 illustrates this broad aspect of the invention. 101 is a spiral grating formed in a surface of suitable reflective material, 102, such as that described later in reference to FIG. 10.

An area of the reflective material is left unruled to comprise inlay 104, which, for illustrative purposes is shown as a T-shaped inlay, interrupting the spiral grating rulings 105, which are preferably of about 14,000 lines/inch spacing.

The inlay lies somewhat away from the center, 103, of the spiral ruling. Arcs $a$ and $b$ define the angle subtended by the inlay with respect to the center of the ruling. Assume that there is a suitable point-source of light at an optimum distance above the plane of the grating, several feet away from it and centered on arc $b$. An observer appropriately located on arc $a$ will see spectra of the light source diffracted by the grating, and interrupted by the inlay. There will be color contrast between the inlay and the diffracting area of the grating and this color contrast will obtain so long as the observer remains on his arc between its limits.

Obviously, then, in a spiral grating, the greater the angular width of the inlay with respect to the center of the grating, the larger the arc over which it is set-off by color contrast, other things being equal. In FIG. 1, the arc is about 90 degrees wide. To see what this means in terms of inventive improvement over the old art, assume that the grating 101 is not spiral, but rather is ruled with straight lines parallel to the cross-bar of the T inlay, and perpendicular to the direction of the light source. With the straight-line grating, maximum color contrast between grating and inlay will be apparent only to an observer located very near the bisector of the arc.

The reason for this is readily apparent, since the width of the projected spectrum from a plane straight-line grating is simply a function of the distances involved and of the line length of the grating: when the light source is several feet away, angular width of the projected spectrum is, at most, a very few degrees.

Movement of the observer through a relatively narrow angle to either side of the bisector location will remove him from the region in which the spectrum is projected, and he will be unable to detect the inlay through contrast with the spectrum regardless of the angular width of the inlay.

Figure 2:
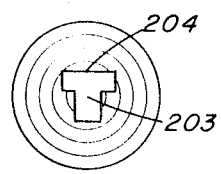

FIG. 2 illustrates an embodiment of the invention in which the inlay 204 is made 360 degrees wide with respect to the center 203 of the spiral ruling by having a part of the inlay positioned "over center." The outstanding advantage results that, under good lighting conditions, the presence of the inlay will be obvious to observers in a full circle about the grating. The same advantage results from the use of an inlay which merely encircles the center of the grating without covering it as, for example, a ring-shaped inlay.

Figure 3:
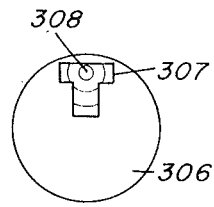

FIG. 3 shows an embodiment of the invention in which the inlay 307 is a spiral grating and the unruled background 306 is so related as to interrupt the grating and define the inlay design.

Because the center 308 of the spiral ruling is made to lie within the outer boundaries of the inlay, under good lighting, color contrast between the inlay and the background will be apparent at all azimuths about the grating.

Figure 6:
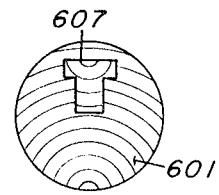

Even if, for reasons of design, the center of the spiral grating is outside the portion of the grating forming the inlay, substantial advantages in contrast visibility are realized over straight-line grating inlays. FIG. 6, to which later reference will be made, shows this relation.

Figure 4:
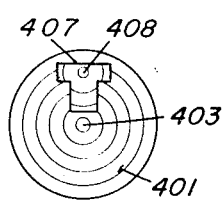

In the FIG. 4 embodiment of the invention, spiral grating 401 is used as background and inlay 407 is also a spiral grating. Offset of the centers of the ruling 403 and 408 provides color contrast definition of the inlay. The same angular visibility advantages obtain over straight-line gratings as were described in connection with FIGS. 1–3.

Figure 5:
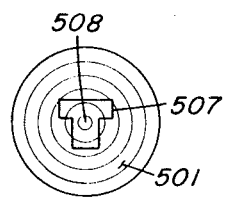

FIG. 5 shows versions of the invention in which the same center 508 is used for the rulings of the background and inlay spiral gratings 501 and 507 respectively. Contrast between background and inlay is achieved by one of two means. The first is by making one of the two rulings coarser than the other so that the spectra of the two gratings are projected at different angles, producing visible color contrast between background and inlay. The other means of producing the contrast is by varying the blaze angle (side angle of the ruling tool) of one of the rulings from that of the other so that the respective spectra are projected at different angles. In either case, presence of the inlay is made apparent under good lighting to observes in a full circle about the grating.

FIG. 6 shows arrangement of spiral gratings 601 and 607 in which the centers of ruling are beyond the peripheral edges of the patterns. Striking effects can be produced by such inlay techniques.

Figure 7:
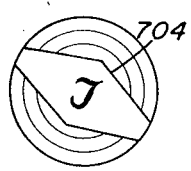
Figure 12:
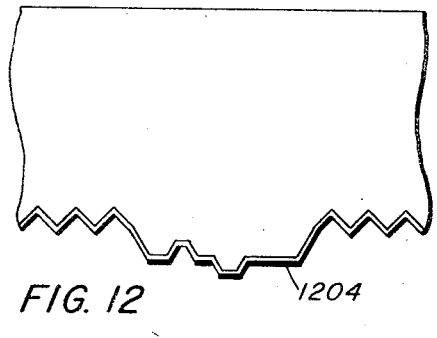

FIG. 7 is to be compared with FIG. 2, and with FIG. 12, an enlarged sectional view of an embodiment of the invention. The inlay pattern 704 can be embossed in various ways, ruled, or provided with an arbitrary design as, for example, the initial T shown in FIG. 7.

Figure 8:
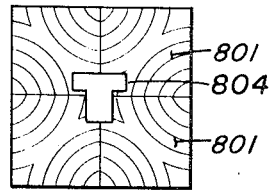

FIG. 8 illustrates an embodiment of the invention in the form of an inlay 804 in a background mosaic of spiral grating segments, 801.

Mosaic is used, in this context, in the sense of elements assembled to form a mixed whole in appearance in contrast with inlay, which is used in the sense of shape or shapes by design distinguished from the background.

In this embodiment the inlay is arranged to be set off by color contrast at all azimuths even though it does not encompass the center of ruling of any segment. The inlay interrupts the rulings of plural segments so oriented that a spectrum can be produced from at least one segment at any given azimuth.

Figure 9:
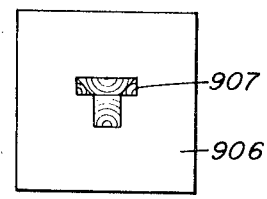

The FIG. 9 embodiment is an inverse of that of FIG. 8 in that the background 906 is unruled and the inlay comprises a mosaic of grating segments 907 severally oriented.

Figure 10:
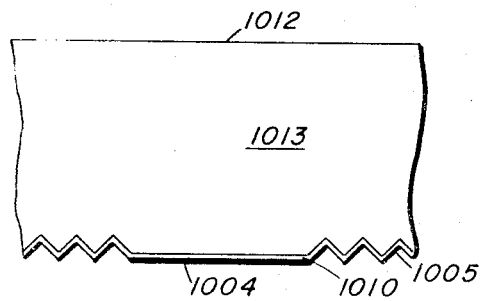
FIGS. 10–14 are cross sections of embodiments of the invention.

In FIG. 10, an enlarged sectional view of one version of the invention, 1013 is a transparent film of cellulose acetate or other suitable material to which a reflective film 1010 of aluminum or the like has been applied, as by thermal evaporation.

Ruling 1005 and inlay pattern 1004 are produced in this film assembly, preferably by impressing the film using a ruled die having the desired inlay pattern recessed in its working face. Heating the film, or the die, or both, facilitates the process.

Other methods of fashioning and protecting the inlay are possible, such as cutting away its shape in the background and fitting in an inlay made of suitably worked foil. However, this leaves the inlay unprotected and subject to working loose and wear. Covering the assembly with a transparent protective membrane will protect it, but securing conformation of the protective film to the inlay is difficult.

Making grating, inlay, and protective membrane of a single piece of film according to this invention avoids the difficulties of working loose and wear, and enforces exact conformance, amounting to optical contact, between the transparent film and the diffracting and reflecting surfaces. Such brilliant optical performance results that the unaided eye cannot distinguish the side of the assembly covered by the protective membrane.

Figure 11:
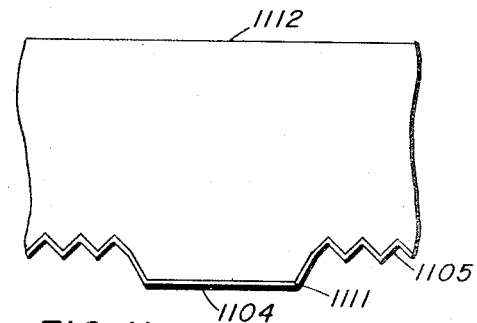

FIG. 11 is a section similar to that of FIG. 10, and shows a preferred version of the invention in which the inlay 1104 is displaced out of the average surface plane of the spiral ruling 1105. The resultant reflective slopes 1111 around the inlay help define its outline, especially as against those portions of the grating which are not at a given time illuminated so that they afford color contrast with the inlay. The slopes also enhance the contrast if the inlay is ruled and the background is plain, and if both background and inlay are ruled.

The embossed inlay embodiment is produced by impressing the film between a die relieved in the area of the inlay and a backing pad somewhat softer than would be used for the unembossed version. Obviously, a multiple plane embodiment which is the inverse of FIG. 11 is as easily produced.

FIG. 12 carries the inlay embossing principle one step further—in this embodiment the inlay 1204 is formed to the contour of relief in the die. Both random effects, as pebble graining, and arbitrary designs, as in FIGS. 7 and 12, are produced by this method.

Figure 13:
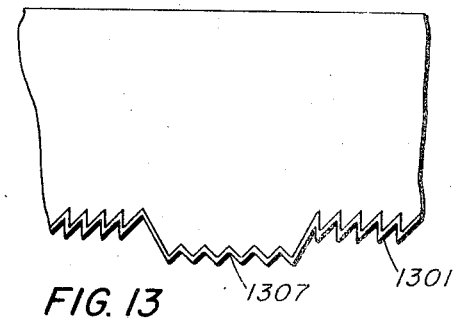

FIG. 13 is a section through an embodiment having coarse and fine gratings 1301 and 1307, as in FIG. 5, showing the relation of the rulings. Differing blaze angles are indicated.

Figure 14:
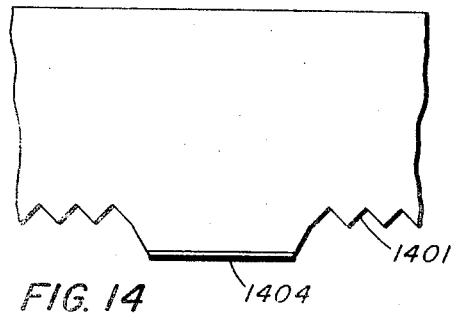

FIG. 14 is a section through an embodiment of the invention used in transmission rather than reflection. Either the background, 1401, the inlay 1404, or both, is made without a reflective coating. This version can be made in embodiments, corresponding to those of the other figures and the same advantages accrue.

Figures 15, 16:
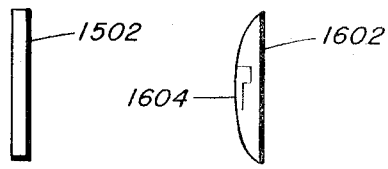
FIGS. 15 and 16 are edge views of embodiments of the invention.

FIGS. 15 and 16 are edge views indicating the adaptability of the inlay structure of this invention both to flat surfaces and to compound-curvature surfaces.

Aspects, and in particular the mosaic aspect, of this application relate to my copending U.S. application No. 467,312 entitled Diffraction-Type Mosaic System, and filed June 28, 1965, now abandoned.

It should be noted that spiral ruling is not a limitation of this invention as other rulings about a common center, termed circular whether perfectly circular or not, will also serve.

In like manner, the invention is not confined to the shapes nor to the designs shown, as other shapes and designs may be arbitrarily chosen to suit the application.

Many embodiments of the present invention beyond these shown and described are embraced within its teachings, and limitation to the exact examples given is not intended.

I claim:

1. In a diffraction grating inlay formed of a single piece of sheet material having a multi-planar surface, the subcombination of a circularly ruled and an unruled area contiguously related in respectively different substantially parallel planes of the sheet material, and reflective slopes outlining said contiguous relation.

References Cited

UNITED STATES PATENTS

| | | | |
|---|---|---|---|
| 1,354,471 | 10/1920 | Doner | 350—162 X |
| 2,133,081 | 10/1938 | Colvin. | |
| 2,463,280 | 3/1949 | Kaehni et al. | 350—162 |
| 2,464,738 | 3/1949 | White et al. | 350—162 X |

JOHN K. CORBIN, Primary Examiner

U.S. Cl. X.R.

161—134